(12) United States Patent
Lancaster

(10) Patent No.: US 6,820,857 B1
(45) Date of Patent: Nov. 23, 2004

(54) NEEDLE VALVE WITH SOFT TIP STEM

(75) Inventor: Michael F. Lancaster, Middleburg Hts, OH (US)

(73) Assignee: Noshok, Inc., Berea, OH (US)

( * ) Notice: Subject to any disclaimer, the term of this patent is extended or adjusted under 35 U.S.C. 154(b) by 0 days.

(21) Appl. No.: 10/065,667

(22) Filed: Nov. 7, 2002

(51) Int. Cl.⁷ ............................................. F16K 25/00
(52) U.S. Cl. ..................... 251/85; 251/122; 251/334; 251/358
(58) Field of Search .................. 251/358, 85, 122, 251/334

(56) References Cited

U.S. PATENT DOCUMENTS

| | | | | |
|---|---|---|---|---|
| 2,573,623 A | * | 10/1951 | Stover | 251/85 |
| 2,952,439 A | * | 9/1960 | Koons | 251/85 |
| 3,317,183 A | * | 5/1967 | Szwargulski | 251/358 |
| 3,326,521 A | * | 6/1967 | Murray | 251/358 |
| 3,472,481 A | * | 10/1969 | Spies, Jr. | 251/85 |
| 4,119,296 A | * | 10/1978 | Scapes | 251/333 |
| 4,721,284 A | * | 1/1988 | Bankard | 251/86 |

* cited by examiner

*Primary Examiner*—John Bastianelli

(57) ABSTRACT

A needle valve having a soft tip adapted for sealing an annular valve seat of a body port. The soft tip may be defined as two dissimilar circular rod sections of ductile plastic with the larger diameter having a conical taper. The soft tip is pressed into a mating hole in the metal portion of stem up to its annular seat. A thin metal tubular section of the metal stem is cold formed over the soft tip to retain it in place. The metal retainer secures the soft tip in the axial direction and limits the radial expansion of the soft tip while it is cold formed over the annular valve seat of the body port. The metal retainer also limits the axial movement of the stem to its maximum operating position. Under high axial forces, the soft tip does not rotate relative to the valve seat. A resilient high-pressure seal is achieved with this arrangement.

3 Claims, 4 Drawing Sheets

NEEDLE VALVE WITH SOFT TIP STEM

BACKGROUND OF INVENTION

This invention relates to valves and in particular to needle valves having soft movable seating members. This invention also relates to valve stems that contact a valve seat and at the same time do not rotate relative to the valve seat. These two needs have been known in the art for some time.

A valve stem that contacts a valve seat and at the same time does not rotate eliminates the wear and scoring caused by excessive friction. A well-known solution to this problem is a floating metal ball attached to the end of the stem as illustrated in U.S. Pat. No. 3,529,805 of Callahan. Metal balls, however, do not seal seats that have been deformed due to corrosion. Also, balls open and close an orifice quickly and thus do not have the metering characteristics of a traditional needle valve that opens the orifice gradually with a long tapered tip.

In certain process systems there exists a need for valves to carry corrosive fluids such as a flow stream carrying high velocity particulates or aggressive chemicals. These systems may also be under high pressures and elevated temperatures. There is a constant requirement in such systems to maintain the fluid control valve in good operating condition. The sealing seats of metal valves wear rapidly in corrosive environments. Because the metal seats cannot be easily repaired, it often results in the loss of the valve. Although metal valves with metal-to-metal seals are not generally preferred for corrosive environments, their low cost and high pressure capacity continue to justify their use. Exotic and expensive metals may be employed in such cases. Plastic valves offer another alternative but may actually be costlier then metal and their operating limits on pressure and temperature are drastically reduced.

A solution to a metal-to-metal sealing arrangement is a metal-to-plastic sealing arrangement or what is commonly referred to in the industry as a soft seat. The soft seat can take two forms. The traditional form involves placing the soft material in the body of the valve and another form involves securing the soft material on the stem. The present invention uses the later or what is more accurately described as a soft tip stem.

An example of a soft seat inserted in the body is shown in Nimberger's U.S. Pat. No. 4,630,629. Alignment of the soft seats in the bodies flow path must be taken into account. Two potential leak paths exist between the soft seat and body and the soft seat and stem. Also, soft seats are difficult to replace and remove. A seat removing tool as shown in U.S. Pat. No. 5,042,151 of Walter Roush illustrates the problems of removal. Soft seats integral with the body do not rotate and therefore the stem must rotate on the seat causing excessive wear of the seat.

In U.S. Pat. No. 4,119,296 of John Scapes, the attachment of a soft tip to the stem is accomplished with the use of a screw. The present invention eliminates the screw and extra retaining parts. In U.S. Pat. No. 6,007,049 Lloyd Wass molds threads on the soft tip and screws it into the metal stem. This tip must rotate with the stem and thus against the seal during contact which results in frequent repair and replacement. Nothing limits the radial expansion or the axial travel of the tip as it is being crushed against the sealing surface.

The disadvantages of the prior art are overcome by the present invention. Improved methods and apparatus are herein provided for effectively sealing a fluid passage within a valve body.

SUMMARY OF INVENTION

A valve is provided wherein a soft tip is attached to a metal stem defining the soft movable sealing member. The soft tip is allowed to rotate during sealing and utilizes the retaining means as a secondary seal.

The valve stem is threaded in a valve bonnet and the bonnet is threaded into the valve body. The bonnet aligns the soft tip over an annular seat in the valve body and a torque of the valve handle moves the soft tip in an axial direction towards and away from the seat.

It is a feature of the current invention that the soft tip stem can easily replace solid metal stems that act as a traditional metal-to-metal seals in a needle valve. The shape of the soft tip stem is identical to the solid metal steam counterpart. Therefore, it can effectively convert a metal-to-metal hard seat valve into a soft seat valve by swapping out the stems and utilizing the same bonnet and valve body with no changes in the body sealing seat. Depending on the application, soft tip stems may be used as replacement parts to extend the life of a hard seat valve.

It is a further feature of the present invention to satisfy the objective of providing an improved needle valve with a soft tip that can effectively seal high pressure fluids in demanding corrosive environments with the same pressure ratings as the metal-to-metal valve.

The soft tip can easily conform to a corroded body seal that would often be a pin hole leak on metal-to-metal seals without having to apply a high torque to the valve handle. Radial expansion is controlled by enveloping a portion of the soft tip with the metal.

It is another feature that the soft tip is attached to the stem in a simple and economical way. No adhesives or threads are used. A simple form tool and press is all that is required.

It is also a feature that the two components have a simple form and are easily manufactured. The shape of the soft tip can be easily molded out of a wide variety of plastic materials. This is important when considering the fluids that are used in the valve.

These and other features and benefits of the invention will be apparent from the following detailed description and those skilled in the art, wherein reference is made to the figures in the accompanying drawings.

BRIEF DESCRIPTION OF DRAWINGS

The features and advantages of the present invention will be apparent from the following description taken in connection with the figures contained wherein.

DETAILED DESCRIPTION

Figure 1:
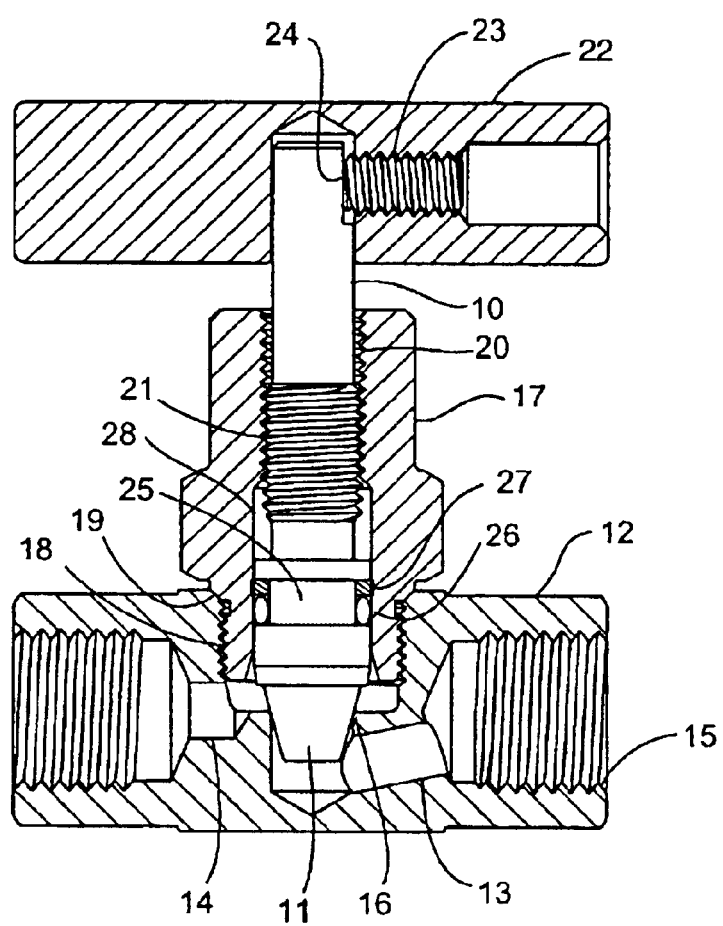
FIG. 1 is a pictorial view, full cross-section, of the valve structure embodying the present invention with the stem in the closed position

An improved valve structure is depicted in FIG. 1 as defining a needle valve having a metal stem 10 with a soft tip 111 according to the present invention. The valve body 12 comprises a fluid passageway with inlet 13 and outlet 14 ports that are typically threaded for corresponding pipe threads 15. A portion of the body within the fluid pathway includes an annular seat 16 that engages with the soft tip to seal closed the valves fluid passageway.

The valve includes a bonnet 17 that is threaded 18 into the body. A high torque is applied to the bonnet and it is sealed against a mating annular seat 19 in the body by metal-to-metal contact. The bonnet is internally threaded 20 to accept the threaded stem 21 that is rotated by means of an attached handle 22.

The handle may be secured to the outer end of the stem by suitable means such as a set screw 23. The set screw is secured against the flat section 24 milled on the end of the stem. The handle is easily removed and can be replaced by a wide variety of handles.

The stem seal in the valve bonnet assembly is fitted in a groove 25 and is composed of a suitable elastomeric o-ring 26 (e.g., Viton®) and a suitable plastic back-up ring 27 (e.g., Teflon®) which run along the inside of the bonnet bore 28. The soft tip material is made from an engineered polymer (e.g., Delrin®).

The valve in FIG. 1 is shown to represent a typical needle valve in which the present invention can be used. It may be used in many needle valves with similar sealing arrangements. Engaging the stem tip 11 against similar annular seats 19 of various bodies can seal fluids between the bodies inlet 13 and outlet 14 passages.

Figure 2:
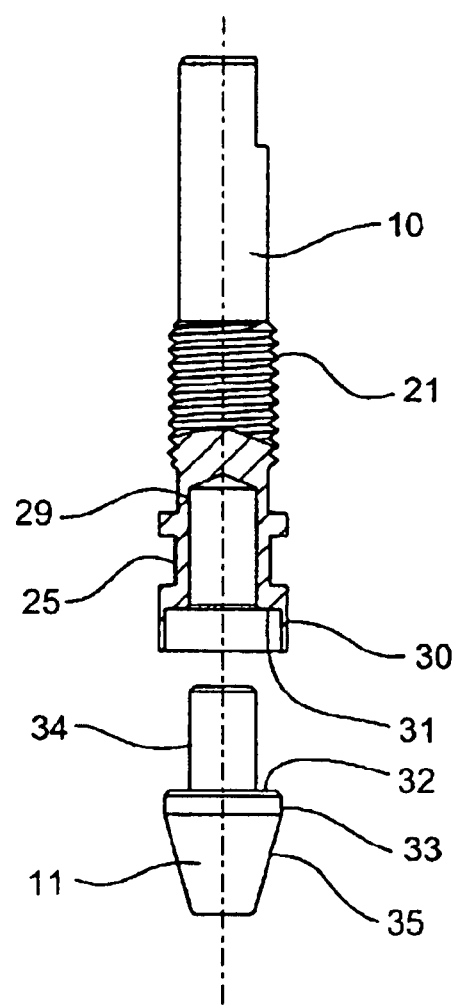
FIG. 2 is an exploded pictorial view, partially in cross-section, of the stem assembly before it is assembled and formed

The stem assembly is composed of a metal stem part 10 and a soft tip part 11 as depicted in FIG. 2. The metal stem part has threads 21, an o-ring groove 25, a hole 29, and a thin tubular section 30 extending a precise amount beyond an annular seat 31. The soft tip part 11 has a corresponding annular section 32 that mates with the annular seat of the metal stem part when it is press fit into the hole 29. The soft tip shaft 34 and the concentric section 33 have a press fit in the metal part that insure that the parts are centered with respect to their axis of rotation and held in position during the forming operation. The press fit is light enough to allow rotation while operating in the valve. Once the soft tip 11 is pressed into the metal part 10, the assembly is place soft tip down into a tapered forming fixture which rests against the tubular end of the metal 30. A high axial force is applied to the handle end of the metal stem which cold forms the thin tubular section 30 of metal in on itself forming a tapered conical section along side the soft tips conical taper 35. Metals that respond well to cold working are strengthened by this process. The amount of material that can successfully be reduced without warping, bending, or tearing is a critical design consideration in the present invention. The balance between thickness and length is critical. The tubular section must be thin enough to be formed and strong enough to perform it's sealing functions.

Figure 3:
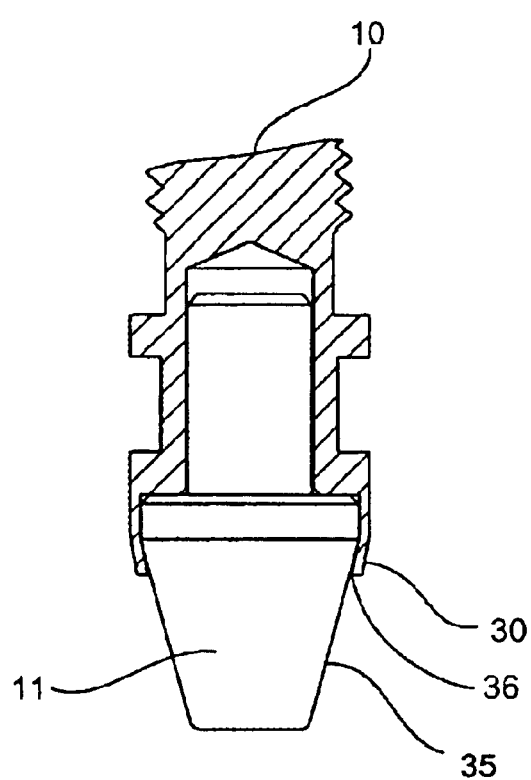
FIG. 3 is a detailed pictorial view, partially in cross-section, of the stem assembly tip in the formed state

The finished state of the stem assembly is depicted in FIG. 3. The metal tubular section 30 is tapered to an angle that is slightly less then the angle on the soft tip 36 to ensure that the tip is held in the axial direction and gripped lightly enough to allow rotation under high amounts of torque. Allowing the soft tip to rotate under high torques reduces the damaging frictional effects that can occur when the soft tip rotates against, instead of pressing against, the body seal under high loads. The simplicity of the design provides an economical and quick way of joining the two-piece stem thereby eliminating the use of adhesives, screws and/or additional joining components.

Figure 4:
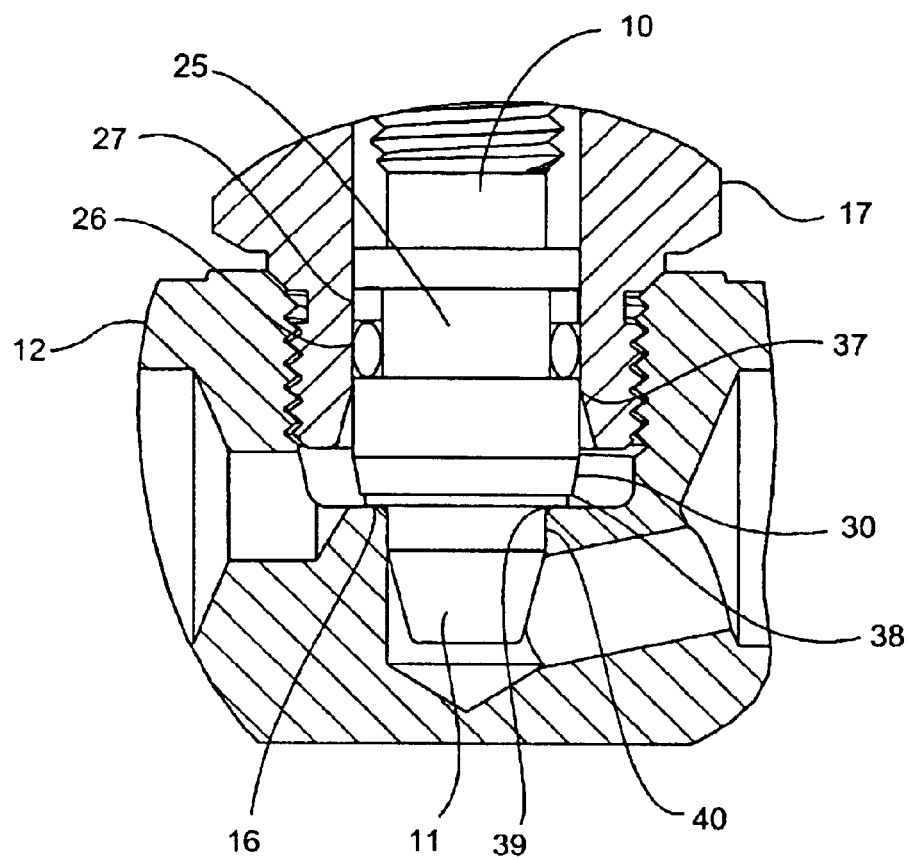
FIG. 4 is a detailed pictorial view, partially in cross-section, of the valve assembly with the stem in its maximum extended position.

The stem soft tip closes the fluid passageway with a torque of the valve handle 22. Rotating the handle moves the stem 10 in an axial direction towards and outwardly from the seat of the valve body 16. Very little torque is needed to seal the passageway as the soft tip 11 is forced against and slightly deformed by the seal edge of the body. The ratio of the force exerted by the torque and the contact area on the seat is what achieves a high-pressure seal against the stem tip. The ability of the soft tip to deform against the metal seat of the body insures a bubble tight seal. Repeated cycles, using the proper amount of torque, produces a force below the yield strength of the soft tip which leaves only a slight wear impression. The small size of the impression provides a visual indication that excessive torques were not employed during operation. Excessive torques can be damaging to the longevity of the soft tip. Yet, even under this excessive torque, the tip continues to yield against the sealing surface maintaining the necessary contact area required for the integrity of the seal. Permanent deformation therefore does not necessarily require the replacement of the stem. The length that the metal envelops the soft tip limits the travel and the mushrooming effects caused from excessive torque. In its maximum extended position FIG. 4, the retaining end 38 of the metal stem 30 acts as a metal-to-metal seal against the annular seat of the body 16. The metal-to-metal contact further acts as a positive stop for the stem. Beyond this point 37, the o-ring would be out of position in the bonnet and the stem seal would be compromised. The deformed soft tip is effectively trapped between the tapered metal retaining portion of the stem 30 and the seat of the body 16 acting as a face seal 39. The contact area in the fluid passageway hole 40 is also increased which effectively increases the path length required for a leak. In this excessively deformed state, the taper on the stem 35 is reduced and therefore the flow characteristics and metering capabilities of the needle valve are reduced. The valve, however, can continue to function as a positive shut-off valve.

The shape of the soft tip during its useful life is a unique characteristic of the present invention. Because the soft tip stem can continue to seal after being deformed, and is forgiving enough to allow for slight imperfections in the body seat it can continue to be an effective seal. This is of special importance if the annular sealing surface of the body is damaged in some way from corrosion, cavitations, chemical attacks, etc. The soft tip is thick enough to compensate for these irregularities. The ability of the soft tip to seal after the metal seat is damaged can greatly extend the life of the valve. Thus, the present invention comprehends an improved valve structure wherein the soft tip portion of the movable valve element provides an extremely simple and economical means of constructing a flexible, long lasting, positive seal.

What is claimed is:

1. In a valve including a metal valve body that defines a flow chamber having a port with an annular seat and a metal valve stem having a central axis and rotatable within said metal valve body movably mounted in relation to said metal valve body for moving a soft tip towards and outwardly from said annular seat, an improvement for sealing an annulus between said metal valve body and said soft tip, said improvement comprising:

(a) a conical shaped soft tip having a tip diameter smaller than said annular seat and a maximum diameter larger than said annular seat;

(b) cylindrical mounting means on said metal valve stem of said conical shaped soft tip with an inwardly facing annular shoulder and a hole to align said conical shaped soft tip coaxially to said metal valve stem and said annular seat; and (c) retaining means on said metal valve stem of said conical shaped soft tip consisting of a thin tubular section greater than the diameter of said conical shaped soft tip for effectively retaining said conical shaped soft tip as it is moved toward and outwardly from said annular seat during each successive forcing of said conical shaped soft tip against said annular seat as said conical shaped soft tip is cold formed to the shape of said annular seat;

wherein said retaining means limits the inward movement of said conical shaped soft tip towards said annular seat; said retaining means acts as a secondary metal to metal seal; said retaining means extends beyond said annular shoulder of said metal valve stem to be effectively cold formed in the desired conical shape thereby capturing said conical shaped soft tip; said retaining means limits the radial expansion of said conical shaped soft tip; said retaining means allows rotation of said conical shaped soft tip with respect to said metal valve stem: and during high axial force contact with said annular seat, said conical shaped soft tip does not rotate relative to said annular seat.

2. A valve of claim 1 wherein said conical shaped soft tip is made from an engineered polymer.

3. A valve of claim 2 wherein said engineered polymer is a polyacetal engineering resin.

* * * * *